United States Patent [19]
Unger et al.

[11] Patent Number: 4,911,903
[45] Date of Patent: Mar. 27, 1990

[54] SPHERICAL SIO₂ PARTICLES

[75] Inventors: Klaus Unger, Seeheim-Jugenheim; Herbert Giesche, Kl.-Winternheim; Joachim Kinkel, Guldental, all of Fed. Rep. of Germany

[73] Assignee: Merck Patent Gesellschaft mit Beschrankter Haftung, Darmstadt, Fed. Rep. of Germany

[21] Appl. No.: 218,000

[22] Filed: Jul. 12, 1988

Related U.S. Application Data

[62] Division of Ser. No. 911,534, Sep. 25, 1986, Pat. No. 4,775,520.

[30] Foreign Application Priority Data

Sep. 25, 1985 [DE] Fed. Rep. of Germany ....... 3534143
May 14, 1986 [DE] Fed. Rep. of Germany ....... 3616133

[51] Int. Cl.⁴ ............................................. C01B 33/12
[52] U.S. Cl. ..................................... 423/335; 423/338; 502/8
[58] Field of Search ....................... 423/335, 338, 339; 502/8

[56] References Cited

U.S. PATENT DOCUMENTS

4,389,385 6/1983 Ramsay ............................... 423/338

FOREIGN PATENT DOCUMENTS

1568826 5/1969 France ................................. 423/335
2207709 9/1987 Japan ................................... 423/335
888562 2/1976 U.S.S.R. .............................. 423/335

*Primary Examiner*—John Doll
*Assistant Examiner*—Lori F. Cuomo
*Attorney, Agent, or Firm*—Millen, White & Zelano

[57] ABSTRACT

Highly monodispersed nonporous spherical SiO₂ particles are prepared having mean particle diameters between 0.05 and 10 μm with a standard deviation of not more than 5% and a method for the preparation of such particles. The particles can be produced by a two step process wherein first a sol of primary particles is prepared by hydrolytic polycondensation of tetraalkoxysilanes in an aqueous/alcoholic ammoniacal medium. The SiO₂ particles are then converted to the desired particle size by a continuous measured addition of tetraalkoxysilane or organotrialkoxysilane controlled by the extent of the reaction. The SiO₂ particles produced by this process are particularly useful as sorption material in chromatography.

4 Claims, No Drawings

SPHERICAL SIO₂ PARTICLES

This is a division of application Serial No. 06/911,534 filed Sept. 25, 1986, now U.S. Pat. No. 4,775,520.

BACKGROUND OF THE INVENTION

The invention relates to a method for the preparation of highly monodisperse, nonporous spherical $SiO_2$ particles and also to the $SiO_2$ particles produced by the method.

Spherical $SiO_2$ particles are of special interest as valuable aids in the technical and scientific field and are also the object of scientific study. An important field of application of $SiO_2$ particles, especially accurately defined particles of uniform size, principally in the nm and μm region, is their use in standardization. For example, $SiO_2$ particles are used as calibration standards for determining the size of small objects such as dust particles or cells. A further field of application for these particles is their use as sorption or carrier materials in the field of chromatography and in separation techniques derived therefrom. In all such applications, particle size and particle size distribution play a considerable part. Therefore, it is important to be able to produce such particles in a predeterminable and reproducible manner in relation to particle size characteristics.

That spherical $SiO_2$ particles can be obtained by hydrolytic polycondensation of tetraalkoxysilanes is known from the prior art, for example, from the publications by W. STOBER et al. in *J. Colloid and Interface Science* 26, 62 (1968) and 30, 568 (1969) and from U.S. Pat. No. 3,634,588, which disclosures are entirely incorporated by reference herein. From these documents the basic reaction conditions for this purpose can be inferred. These documents disclose a process in which tetraalkoxysilane is introduced into an excess of an aqueous/alcoholic ammoniacal hydrolysis mixture wherein thorough mixing is provided by suitable measures such as stirring, shaking or ultrasonic treatment. In this process, depending on the choice of the specific experimental parameters, $SiO_2$ particles of various mean particle size and varying particle size distribution can be obtained. According to the data of the publications cited, $SiO_2$ particles with mean particle sizes between 0.05 and 2 μm (in isolated cases up to approximately 3 μm) were obtained.

Also, the influence of various esters of silicic acid, of ammonia and water concentration and of various alcohols in the hydrolysis mixture were investigated. From the results, which were possible to confirm by in-house investigations, it may be inferred that it is possible to some extent to obtain monodisperse spherical particles only in the particle size region up to about 2 um, without it as yet being possible, however, to control the reproducibility adequately. Thus, the standard deviations for the particle diameters usually lie between about 5 and 15%. In isolated cases standard deviations of up to 50% were observed. Attempts to prepare monodisperse particles of larger diameter were unsuccessful. The preparation of particles with diameters of over 3 μm was not described. According to the publications cited, the particles were prepared and only characterized in the form of their hydrosoles. The particles were not isolated as particles per se. Consequently, any data on the other properties of the particles, particularly their porosity, are lacking.

In in-house investigations on $SiO_2$ particles prepared by the method of STOBER et al. and then isolated by seidmentation or centrifugation and subsequent drying, it was found that such particles have a marked microporosity. This manifests itself in the specific surface area, which can be measured, for example, by gas adsorption (for instance, by the BET method) and which, depending on the given experimental conditions, exceeds the surface area calculated theoretically by a factor of 10-100.

Naturally, the microporosity of the particles affects their properties substantially. However, for many of the above mentioned uses of $SiO_2$ particles, it is regarded as advantageous for the particles to have virtually no porosity, i.e., have a completely closed surface.

SUMMARY OF THE INVENTION

It is an object of this invention to provide spherical $SiO_2$ particles which are highly monodisperse and have substantially no porosity.

It is another object of this invention to provide a method for producing spherical $SiO_2$ particles which are highly monodisperse and have substantially no porosity.

Another object of this invention is to provide a method for producing monodisperse spherical $SiO_2$ particles in which the particle size is highly reproducible and predeterminable.

A further object of the invention is to provide spherical monodisperse $SiO_2$ particles having a particle diameter of up to 10 μm.

A further object of the invention is to provide a method for producing monodisperse spherical $SiO_2$ particles with substantially no porosity and which contain organic groups within the $SiO_2$ matrix.

A further object of the invention is to provide a method of chromatography employing monodisperse spherical $SiO_2$ particles having substantially no porosity.

Upon further study of the specification and appended claims, further objects and advantages of this invention will become apparent to those skilled in the art.

Surprisingly, it has now been found that spherical, virtually nonporous $SiO_2$ particles with mean particle diameters of between 0.05 and 10 μm and with a standard deviation of not more than 5% can be obtained if a sol of primary particles is first obtained in the known manner by hydrolytic polycondensation of tetraalkoxysilanes in an aqueous/alcoholic ammoniacal medium and the $SiO_2$ particles obtained are then converted to the desired size by a continuous measured addition of tetraalkoxysilane. The size attained is controlled by the extent of the reaction.

DETAILED DESCRIPTION

By this process the $SiO_2$ particles finally obtained accumulate as discrete particles of strictly spherical shape and strictly uniform size, i.e., highly monodisperse, and substantially without any porosity. In addition, it was possible to obtain organically modified $SiO_2$ particles which are also virtually non-porous and highly mono-disperse.

Furthermore, it was found that, owing to their specific properties, the $SiO_2$ particles prepared according to the invention are well suited as special sorption materials in chromatography. In particular, organically modified $SiO_2$ particles prepared according to the invention exhibit advantages when used as sorption materials in the reversed-phase chromatography of biological molecules of high molecular weight such as, for example, proteins, which are not achieved by conventional sorption agents used in this connection. The most important advantages are a substantially higher column efficiency and, consequently, also a higher detection limit.

The subject of the invention is therefore a method for the preparation of spherical $SiO_2$ particles by hydrolytic polycondensation of tetralkoxysilanes in an aqueous/alcoholic ammoniacal medium, in which method a sol of primary particles is first produced and the $SiO_2$ particles obtained are then converted to the desired size by a continuous measured addition of tetraalkoxysilane controlled by the extent of the reaction. The particles obtained by this method are highly monodisperse non-porous particles with mean particle diameters of between 0.05 and 10 μm and a standard deviation of not more than 5%.

The subject of this invention also includes the $SiO_2$ particles formed by the disclosed process which are unique owing to their properties.

The subject of the invention also includes the use of $SiO_2$ particles prepared by the method according to the invention as sorption materials in chromatography and, in particular, the use of organically modified particles as sorption materials in the reversed-phase chromatography of biological molecules of high molecular weight such as, for instance, proteins or nucleic acids.

The method according to this invention for the preparation of highly monodisperse nonporous spherical $SiO_2$ particles can be carried out in two steps. In a first step a sol of primary particles is prepared in accordance with the known method. For this purpose the tetraalkoxysilane is introduced into an aqueous/alcoholic ammoniacal hydrolysis mixture and intimately mixed. Suitable tetraalkoxysilanes for use in this method include all the orthosilicate esters of aliphatic alcohols which can be hydrolyzed satisfactorily. Preferred tetraalkoxysilanes are the esters of aliphatic alcohols containing 1-5 C atoms such as, for example, methanol, ethanol, n- or i-propanol and also the isomeric butanols and pentanols. These may be used individually, but also in a mixture. The orthosilicate esters of the $C_1$-$C_3$ alcohols, in particular tetraethoxysilane, are especially preferred.

In addition to aliphatic alcohols, the hydrolysis mixture should contain a content of about 0.5 to about 8 mol/l of ammonia and of about 1 to about 15 mol/l of water. Suitable as the alcohol components of the mixture are aliphatic $C_1$-$C_5$ alcohols, preferably $C_1$-$C_3$ alcohols such as methanol, ethanol and also n- or i-propanol. These may be present individually, but also can be present as a mixture with one another in the hydrolysis mixture. The initial addition of tetraalkoxysilane to the hydrolysis mixture takes place preferably in one batch, it being possible for the tetraalkoxysilane to be present in pure form or in solution in one of the alcohols mentioned. An initial concentration of tetraalkoxysilane in the hydrolysis mixture of between about 0.01 to about 1 mol/l can be chosen to produce the primary particles. After the reactants have been brought together, the reaction starts immediately or after a few minutes, which is indicated by an immediate opalescence or turbidity of the reaction mixture due to the particles produced. In general, the reaction is completed after not more than 15-30 minutes. In unfavorable special cases the reaction will take longer to be completed. Depending on the choice of reactants and also on their concentration in the reaction mixture, particles with mean diameters of about 0.01 to about 2 μm can be obtained in accordance with the known method.

In this first step of the method according to the invention reaction mixtures are preferably employed which contain about 3-13 mol/l of water, 0.5 to 4.5 mol/l of ammonia, 10 to 25 mol/l of alcohol and 0.1-1.0 mol/l of tetraalkoxysilane. In this case primary particles with mean diameters between about 0.01 and 1 μm are obtained. After this first step samples can be taken from the sol of primary particles in order to investigate the particles, for example, by means of electronmicroscopy, in relation to their particle size, trueness of shape and particle size distribution. By isolating the particles of the samples there is a possibility of determining the porosity of the primary particles, for example by gas adsorption measurement.

It has proved advantageous to perform the reaction for producing the primary particles at elevated temperature. Temperatures between about 35° and 75° C., preferably between 40° and 65° C., are beneficial. It has emerged that at elevated temperature the spread in particle size decreases. However, at elevated temperatures the mean particle size also decreases. At lower temperatures, i.e., around room temperature, larger particles with a greater spread in size are obtained for conditions which are otherwise identical. Moreover, at elevated temperatures increased and undesired agglomerate formation may also occur.

In the second step of the method according to the invention a slow, continuous measured addition of further tetraalkoxysilane to the sol of primary particles takes place with uniform mixing. In this connection it is important that the rate of measured addition is controlled so that an immediate, complete reaction with the particles present in the sol take place without an excess of tetraalkoxysilane occurring from which nuclei for new primary particles may form. A controlled secondary growth of the particles in the sol is achieved with this procedure of measured addition of tetraalkoxysilane controlled by the extent of the reaction. The final particle size obtained depends on the quantity of tetraalkoxysilane added in total. The quantity of alkoxysilane to be added in total is in principle not critical provided the hydrolysis mixture is present in excess or is kept in excess by the possible further addition of hydrolysis mixture. There is no upper time limit set for the addition of tetraalkoxysilane, the addition may extend over hours to days.

It is also possible to interrupt and resume the secondary growth since the particles are stable at all stages of their growth. It is also preferable to employ an elevated temperature, e.g., 35°-75° C., preferably about 40° C., in the secondary growth process.

About 0.05 μm, which is dictated by the minimum size of the primary particles, should be set as the lower particle size. In principle it is possible to seal the surfaces of the primary particles by adding an amount of silane small enough so that no significant particle size increase occurs.

It emerges that the particles obtained by the method according to the invention are of uniform spherical shape and exhibit substantially no porosity of any kind. Their specific surface area, determined by gas adsorption, proves to be 1 to 1.5 times the surface area which can be calculated theoretically, which at best allows a slight surface roughness to be inferred but virtually rules out the presence of pores. It is assumed that pores originally present in the primary particles are sealed by the slow, continuous secondary growth and that new pores do not form.

It is astonishing and completely unexpected that the wide particle size spread present in the primary particles (the standard deviations are in that case on average 5–10%) is not found to be repeated in the particles obtainable by means of the secondary growth step. The particles thus obtained have a standard deviation of not more than 5%, usually around or below 2%, and are therefore highly monodisperse. Obviously, an adjustment of the various particle sizes originally present and a uniform further growth of all the particles present with a corresponding decrease in the relative standard deviation takes place in this second step.

Of course, within the scope of this invention are all particles produced by this invention (and corresponding processes) which are of a lowered porosity in comparison to the particles obtained in the first step and/or of lowered standard deviation.

The method according to the invention consequently enables those skilled in the art to prepare highly monodispersed, nonporous spherical $SiO_2$ particles with particle diameters of up to 10 $\mu$m. In particular, it is now possible to make available in this size range $SiO_2$ particles as calibration standards with systematic size gradation, roughly along the lines of a "surveyor's rod", with high precision.

In a special embodiment it is also possible to produce particles of this type which are organically modified in the matrix, i.e., contain organic groups which are covalently bonded. Methods of this type are in principle known.

To prepare organically modified particles, 0.1 to 100%, preferably 1–30% of the tetraalkoxysilane which otherwise would be used is replaced in the method according to the invention, preferably in the secondary growth step, by one or more organotrialkoxysilanes such as are known, for instance, for the modification of silica gels. The organic groups in these compounds may be aliphatic radicals with 1–20 C atoms, optionally functionalized, for instance, by hydroxyl, thio, amino, or carboxyl groups or halogens and also alkenyl radicals. The incorporation of function organic groups into the $SiO_2$ matrix of the particles incidentally makes possible a subsequent further modification by covalent bond linking in a known manner. Examples of organotrialkoxysilanes of this type are, for instance,
methyltriethoxysilane
ethyltriethoxysilane
hexyltriethoxysilane
octyltriethoxysilane
dodecyltriethoxysilane
octadecyltriethoxysilane
vinyltriethoxysilane
3-hydroxypropyltriethoxysilane
3-chloropropyltriethoxysilane
3-aminopropyltriethoxysilane
3-glycidoxypropyltriethoxysilane
3-mercaptopropyltriethoxysilane
3-isothiocyanatopropyltriethoxysilane
3-(aminoethylamino)propyltriethoxysilane
3-methacryloxypropyltriethoxysilane
3-acetoxypropyltriethoxysilane
N-(3-triethoxysilylpropyl)-N'-(1-phenyl-1-hydroxyisopropyl)thiourea
N-(3-triethoxysilylpropyl)-N'-($\alpha$-phenylethyl)thiourea.

The properties of the particles of the invention in relation to nonporosity and monodispersion are not affected by organic modification of this type, while in other respects the known advantageous properties of modified silica gels can be observed.

Naturally, unmodified $SiO_2$ particles prepared by the method according to the invention can also by superficially organically modified through subsequent treatment by methods such as are known for porous materials (for example, in the preparation of reversed-phase chromatographic sorbents).

Organically modified $SiO_2$ particles of this type make possible applications in numerous other fields, for example as tailor-made sorbents for chromatography. In particular, organically modified $SiO_2$ particles prepared by the method according to the invention are suitable for use in reversed-phase chromatography.

The use of organically modified particles makes possible the separation of biological molecules of high molecule weight such as for example peptides, proteins or nucleic acids. Molecules of this type are, for example, lysozyme, ribonuclease A, urease, transferrin, insulin, aldolase, myoglobin, catalase, ovalbumin, LDH, PAP, $\alpha$-chymotrypsin, peroxidase, bovine serum albumin, ferritin, $C_1$-INA, creatine kinase, carbonic anhydrase, amylglucosidase, hemoglobin, interleucin, and others. When particles according to the invention are used for the separation of biological molecules of this type, advantages result which it has so far not been possible to achieve with conventional materials used in this connection.

The low mean particle size, the very narrow particle size distribution and also the diffusion barrier which is lacking in the particles prepared according to the invention compared with the porous materials achieve a substantially higher column efficiency and, consequently, also a higher detection limit when compared to the porous materials of the prior art. Further advantages lie in the substantially shorter analysis times, which are approximately shorter by the factor of 5 compared with the times which are necessary for the conventional materials. Furthermore, the substance losses are substantially lower than when porous materials are used.

There are no restrictions of any kind on the choice of solvent. All known solvent systems may be used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

A hydrolysis mixture is prepared which consists of 11.9 g (0.66 mol) of water, 62.7 g (1.96 mol) of methanol and 2 g (0.012 mol) of ammonia. To said hydrolysis mixture, thermostatted at 40° C., 4.4 g (0.02 mol) of tetraethoxysilane, likewise thermostatted, are added in one batch with thorough mixing. A sol of primary particles having mean particle diameters of 0.07 $\mu$m with a standard deviation of 11% is obtained.

To the sol of primary particles thus obtained 36 g (0.17 mol) of tetraethoxysilane and 450 g of hydrolysis mixture of the above composition are added dropwise while stirring over a period of 24 h. Spherical SiO2 particles having mean particle diameters of 0.145 μm with a standard deviation of 5% are obtained (after centrifugation or sedimentation and drying). The specific surface according to the BET method is 23 m²/g (theoretically calculated surface: 19 m²/g).

EXAMPLE 2

A hydrolysis mixture is prepared which consists of 13.5 g (0.75 mol) of water, 80 g (2.5 mol) of methanol and 0.85 g (0.05 mol) of ammonia. To this hydrolysis mixture, thermostatted at 40° C., 4.2 g (0.02 mol) of tetraethoxysilane, likewise thermostatted, are added in one batch with thorough stirring. A sol of primary particles having mean particle diameters of 0.015 μm with a standard deviation of 15% is obtained.

To the sol of primary particles thus obtained 170 g (0.82 mol) of tetraethoxysilane and 1.9 l of hydrolysis mixture are added dropwise while stirring over a period of 100 h. Spherical SiO2 particles having mean particle diameters of 0.05 μm with a standard deviation of 5% are obtained. The specific surface by the BET method is 64 m²/g (theoretically calculated surface: 55 m²/g).

EXAMPLE 3

A hydrolysis mixture is prepared which consists of 13.5 g (0.75 mol) of water, 64.4 g (1,4 mol) of ethanol and 6.4 g (0.38 mol) of ammonia. To this hydrolysis mixture, thermostatted at 40° C., 4.2 g (0.02 mol) of tetraethoxysilane, likewise thermostatted, are added in one batch with thorough stirring. A sol of primary particles having mean particle diameters of 0.58 μm with a standard deviation of 5% is obtained. Specific surface: $S_{BET}=340$ m²/g; $S_{theor}=4.7$ m²/g.

To the sol of primary particles thus obtained 650 g (3.1 mol) of tetraethoxysilane and 5.9 l of hydrolysis mixture are added dropwise while stirring over a period of 5 days. Spherical SiO2 particles having mean particle diameters of 3.1 μm with a standard deviation of 1.3% are obtained. The specific surface by the BET method is 1.1 m²/g (theoretically calculated surface: 0.88 m²/g).

EXAMPLE 4

A sol of primary particles is prepared as in Example 1. The secondary growth step takes place in an analogous manner, but using a mixture consisting of 4 g (0.019 mol) of tetraethoxysilane and 0.4 g (1.8 mmol) of 3-aminopropyl-triethoxysilane.

Organically modified spherical SiO2 particles having a mean particle diameter of 0.09 μm with a standard deviation of 5% are obtained. The specific surface is 44 m²/g (theoretically calculated surface: 30 m²/g). The carbon component of said particles is 2.4%.

EXAMPLES 5 TO 8

A hydrolysis mixture is prepared which consists of 16.2 g (0.9 mol) of water, 64.8 g (1.8 mol) of methanol and 2.7 g (0.16 mol) of ammonia. To this hydrolysis mixture, thermostatted at 40° C., 4.2 g (0.02 mol) of tetraethoxysilane, likewise thermostatted, are added in one batch with thorough stirring. A sol of primary particles having mean particle diameters of 0.13 μm with a standard deviation of 10% is obtained. Specific surface: $S_{BET}=280$ m²/g; $S_{theor.}=4.7$ m²/g.

The secondary growth is done stepwise. Specific quantities of tetraethoxysilane and also of hydrolysis mixture are added dropwise to 100 ml of the primary sol and the sols obtained in each step, respectively, each in the course of 2 days until a total quantity of 600 ml is reached. Table 1 below shows the quantity of silane added in each stage and also the data relating to the particles obtained.

TABLE 1

| Example No. | Quantity of tetraethoxysilane added | Mean particle diameter/ standard deviation | Specific surface | |
|---|---|---|---|---|
| | | | $S_{BET}$ | $S_{theor}$ |
| 5 | 35 g | 0.265 μm/5% | 14 m²/g | 10.3 m²/g |
| 6 | 54 g | 0.56 μm/3.4% | 5.5 m²/g | 4.9 m²/g |
| 7 | 55.3 g | 1.15 μm/2.6% | 2.6 m²/g | 2.4 m²/g |
| 8 | 55.3 g | 2.4 μm/1.7% | 1.5 m²/g | 1.1 m²/g |

EXAMPLE 9

170 g of silica gel particles prepared according to Example 3 and having a particle diameter of 1.55 μm are provided in 3 liters of a hydrolysis mixture consisting of 1 mol of ammonia/l, 8 mol of water/l and ethanol (remaining quantity) and thermostatted at 40° C. To this solution a mixture consisting of 2.4 g octyltrimethoxysilane and 17.6 g of tetraethoxysilane is added dropwise over a period of 1.5-2 hours. Organically modified, spherical SiO2 particles are obtained. The carbon component of said particles is 1.0%.

Example A

A mixture consisting of 5 proteins is separated by means of a column (length 40 cm, diameter 8 cm) packed with nonporous monodispersed 1.5 μm octyl modified SiO2 particles prepared according to Example 9.

The protein mixture consists of:
(1) Ribonuclease A (MW=13,700)
(2) Cytochrome C (MW=12,500)
(3) Aldolase (MW=156,000)
(4) Catalase (MW=24,000)
(5) Ovalbumin (MW=45,000)

The following solvents are used:
Solvent A: 100% water, with pH adjusted to 2.0 with HClO4
Solvent B: 75% acetonitrile/25% solvent A The separation is performed with a flowrate of 1.5 ml/min.
Gradient change:
The starting conditions are 75% of solvent A in each case; the final value of 100% of solvent B is reached after 3, 10, 20 and 40 minutes.

A comparison of the elution positions of the individual proteins is given in Table 2.

TABLE 2

| Protein | $t_G$(min) 3 | 10 | 20 | 40 |
|---|---|---|---|---|
| Ribonuclease A | 3.2 | 4.2 | 5.4 | 7.9 $t_e$ (min) |
| Cytochrome C | 3.6 | 5.8 | 7.6 | 12.1 |
| Aldolase | 4.2 | 7.1 | 10.8 | 18.8 |
| Catalase | 4.5 | 7.6 | 11.9 | 20.7 |
| Ovalbumin | 4.8 | 8.2 | 13.2 | 23.9 |

$t_G$ = gradient time in minutes
$t_e$ = elution time of a substance in minutes

The table shows that even with an analysis time of only 10 minutes a satisfactorily good separation can be obtained since in this case the elution positions are already sufficiently far apart.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Substantially spherical $SiO_2$ particles having a mean particle diameter of between 0.05 and 10 $\mu$m with a standard deviation of not more than 5%, said particles being substantially nonporous, and said particles having a BET surface area of 1.1–64 $m^2/g$.

2. Substantially spherical $SiO_2$ particles having a mean particle diameter of between 0.05 and 10 $\mu$m, with a standard deviation of not more than 5%, said particles being substantially nonporous and having a BET surface area of 1.1–64 $m^2/g$, wherein said particles are prepared by the process of continuously adding to a sol of primary particles formed by hydrolytic polycondensation of a tetraalkoxysilane in an aqueous/alcoholic ammoniacal hydrolysis mixture, an amount of a tetraalkoxysilane sufficient to lower the porosity of the particles in the sol, said continuous addition being effected at a rate whereby substantially no additional particles are formed and wherein the amount of silane added to the sol is controlled to directly control a resulting increase in particle size.

3. Substantially spherical $SiO_2$ particles according to claim 1, wherein said BET surface area of the particles formed is about 1 to 1.5 times their theoretical surface area.

4. Substantially spherical $SiO_2$ particles according to claim 2, wherein said BET surface area of the particles formed is about 1 to 1.5 times their theoretical surface area.

* * * * *